United States Patent [19]

Raphael

[11] 4,270,426
[45] Jun. 2, 1981

[54] ROTATABLE CUTTING GUIDE

[76] Inventor: Rouchdy B. Raphael, 508 Lyon St., NE., Grand Rapids, Mich. 49503

[21] Appl. No.: 14,260

[22] Filed: Feb. 22, 1979

[51] Int. Cl.³ .............. B27B 13/04; B26D 7/06; B26D 3/10
[52] U.S. Cl. ............................ 83/411 R; 83/439; 83/733; 269/57
[58] Field of Search .............. 83/411 R, 439, 733; 269/57; 33/174 TD

[56] References Cited

U.S. PATENT DOCUMENTS

| 14,268 | 2/1856 | Kern . | |
|---|---|---|---|
| 47,967 | 5/1865 | Low . | |
| 112,353 | 3/1871 | Keith . | |
| 405,148 | 6/1889 | Dallas . | |
| 405,310 | 6/1889 | Harley | 83/411 R |
| 596,738 | 1/1896 | Castle . | |
| 950,175 | 2/1910 | Hotchkiss . | |
| 1,420,218 | 6/1972 | Richards | 269/57 |
| 1,741,082 | 12/1929 | Thiel . | |
| 2,548,698 | 4/1951 | Benge . | |
| 2,625,186 | 1/1953 | Sayers . | |
| 2,653,633 | 9/1953 | Anderson . | |
| 2,696,230 | 12/1954 | Libby . | |
| 2,801,652 | 8/1957 | Mecker, Sr. . | |
| 2,827,084 | 3/1958 | Massongill . | |
| 3,029,848 | 4/1962 | Bombardier . | |
| 3,190,159 | 6/1965 | Wilkie et al. . | |
| 3,398,620 | 8/1968 | Gautron . | |
| 3,554,244 | 1/1971 | Biscardi | 269/57 |
| 3,764,126 | 10/1973 | Arenas | 83/411 R |
| 3,797,542 | 3/1974 | Wood . | |
| 3,995,521 | 12/1976 | Raphael | 83/411 R |

FOREIGN PATENT DOCUMENTS

| 195791 | 2/1908 | Fed. Rep. of Germany | 83/439 |
|---|---|---|---|
| 24501 | 7/1931 | Netherlands | 83/439 |
| Ad.5218 | of 1915 | United Kingdom | 83/439 |

Primary Examiner—J. M. Meister
Attorney, Agent, or Firm—Price, Heneveld, Huizenga & Cooper

[57] ABSTRACT

A cutting guide for use during cutting of work pieces, and especially flexible materials such as foam rubber and the like to insure precise, accurate arcs or curved paths in the work pieces. The guide includes a rotatable plate having an adjustable pivot assembly providing an axis or center of rotation with respect to a base or other support and upstanding, adjustably spaced, support walls which position the work piece for cutting. The base may be a portable plate or the table of a cutting apparatus such as a band saw or the like such that, in either case, the work piece may be supported adjacent a cutting tool such as a band saw blade or the like. The rotatable plate is rotated to move the work piece toward the cutting tool in a precise, controlled arc while the plate and support walls prevent the work piece from moving out of position. Apparatus for remote positioning of the pivot axis may be included.

25 Claims, 13 Drawing Figures

ROTATABLE CUTTING GUIDE

BACKGROUND OF THE INVENTION

This invention relates to apparatus for guiding the cutting of work pieces with cutting apparatuses such as band saws and the like, and, more particularly, to a guide apparatus for guiding the cutting of arcs or curved paths or predetermined radii especially in soft, pliable, flexible materials such as foam rubber, or foam synthetic materials.

A requirement in the seating and upholstery industries in recent times has been the cutting of cushions to various contours for use in seating applications such as in automobiles or office and residential furniture. In the past, it has been common to cut a number of such cushions simultaneously using a large band saw or other cutting tool. The several foam blocks or pieces of foam material are stacked or aligned and guided against the moving saw blade by the saw operator who may follow a template or pattern drawn on one of the cushions. The operator typically grasps the stack of cushions and holds them together by hand while moving the cushions against the saw blade.

A problem with such prior cutting procedures is the fact that the foam material, by its very nature, is soft, flexible and pliable. When unsupported or held merely by hand, such material tends to bend and flex out of its aligned, correct position when pressed against the saw blade. Consequently, inaccurate, irregular cuts resulted.

In order to compensate for the flexing of the material, it was often necessary to hold the material extremely close to the saw blade to prevent its gross flexing and bending. Of course, such holding was extremely dangerous and potentially injurious unless the operator of the saw was extremely skilled and/or experienced so as to prevent engagement of his hand with the saw blade.

A concurrent problem with the prior cutting procedures was the inability of the typical saw operator to guide the cushion or stack of cushions accurately and precisely against the saw blade or other cutting tool. Although he typically followed a pattern on the uppermost cushion, it was difficult to follow the path exactly, meaning that the curves were irregular and could not be reproduced repeatedly or on a large scale suitable for mass production purposes. This resulted in frequent re-cutting and disposal of foam material adding to the overall cost of the manufacturing process.

Accordingly, a need has been apparent for an apparatus which allows the precise, accurate cutting of arcs and curves in one or more work pieces, especially those of a soft, pliable, flexible nature such as foam rubber and other materials in a safe and efficient manner.

SUMMARY OF THE INVENTION

Accordingly, the present invention provides a cutting guide apparatus for use during cutting of work pieces, and especially flexible material such as foam rubber and the like, to insure precise, accurate cutting in arcs or curved paths in the work pieces. The guide basically includes a rotatable member having upstanding, adjustably-spaced support walls for securing the work pieces and a pivot assembly which provides an axis or center of rotation with respect to a base or other support for the rotatable member. The pivot assembly may be adjusted to provide the desired radius of curvature cut in the work piece or pieces held on the rotatable member. In a certain embodiment, apparatus for remote adjustment of the pivot assembly to change the radius is included.

In one form, the cutting guide includes a base; a rotatable member rotatably mounted on the base for rotation about a center; rigid, upstanding support means on the rotatable member for supporting a work piece to be cut in an arc or curved path, and pivot means on the base and rotatable member for providing and fixing a center of rotation of the rotatable member with respect to the base. Thus, the rotatable member is rotatable about the pivot means to guide the cutting of a precise, circular arc or curve in a work piece when the cutting guide is located adjacent a cutting apparatus such as a band or other type saw and a work piece is supported by the support means.

In a more specific embodiment, the pivot means include shaft means extending through an opening in the rotatable member and secured to the base for providing an axis of rotation for the rotatable plate. Securing means for fixing the shaft means at various positions within the opening to provide different radii from the axis of rotation to a cutting apparatus are also included in that embodiment.

In yet another embodiment, remote adjustment means are provided for changing the position of the center of rotation from a position remote from the center of rotation.

Moreover, the guide may include spaced, upright walls including adjustable supports for securing and supporting various sizes of work pieces, such as flexible foam rubber, on the rotatable member.

In other forms, the base may be either a portable, generally planar, rectangular plate, enabling use of the cutting guide on various different types of cutting apparatus, or an existing table of a cutting apparatus such as a band saw with the table including receiving means for receiving and securing at least a portion of the pivot means of the present invention.

In yet another form, the cutting guide may include rotatable means for rotation about a center; a rigid, upstanding, support means on the rotatable means for supporting a work piece to be cut in an arc or curved path, and pivot means on the rotatable means for providing a center of rotation for the rotatable means when the rotatable means is mounted on a support.

The present invention in its various forms provides numerous advantages over prior known structures. First, the guide allows the cutting of precise, even, accurate arcs and circular paths in various work pieces, such as wood, steel and especially flexible material such as foam rubber or the like which is otherwise difficult to handle and cut precisely. The guide enables precise cutting of compound curves in one or many work pieces simultaneously. Firm support of virtually all types of work piece materials is provided. In addition, the radius of curvature to be cut in a work piece may be accurately adjusted with the guide to include radii both large and small. Moreover, the apparatus is easy to use for even inexperienced operators and is also easy to adjust to provide different radiuses of curvature. Also, the guide is durable and versatile and is adapted for long, dependable use with numerous types of cutting tools and apparatuses such as saw tables and the like.

These and other objects, advantages, purposes and features of the invention will become more apparent from a study of the following description taken in conjunction with the drawings.

DESCRIPTION OF THE PREFERRED EMBODIMENTS

Figure 1:
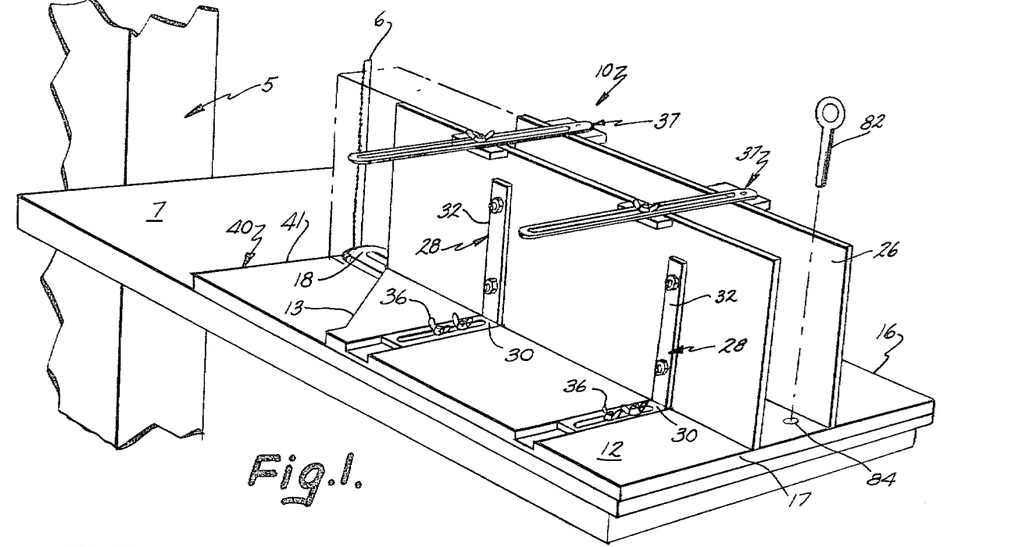
FIG. 1 is a perspective view of a first embodiment of the cutting guide of the present invention located on a saw table of a conventional band saw.

Referring now to the drawings in greater detail, FIGS. 1-5 illustrate a first embodiment 10 of the cutting guide of the present invention. Guide 10 includes four basic elements including a rotatable member or generally planar plate 12, a pair of vertically upstanding work piece support walls 26, 27, a base 40 which is portable with the remainder of the guide in embodiment 10, and a pivot assembly 50 enabling rotation of the plate 12 with respect to base 40 to engage and cut a work piece held by the guide with the cutting blade or tool 6 of a conventional band saw or other cutting apparatus 5 as shown in FIG. 1. The saw or cutting apparatus typically includes a saw table or other platform adjacent its blade on which the portable guide may be placed.

Figure 2:
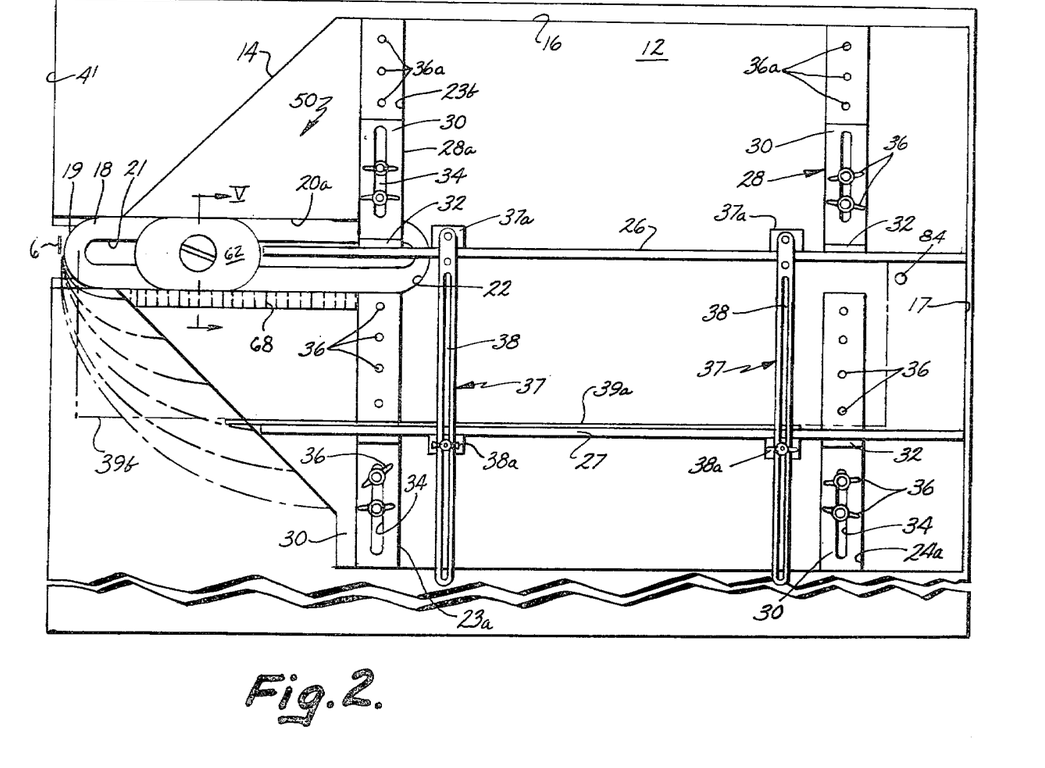
FIG. 2 is a top, plan view of the cutting guide of FIG. 1.
Figure 3:
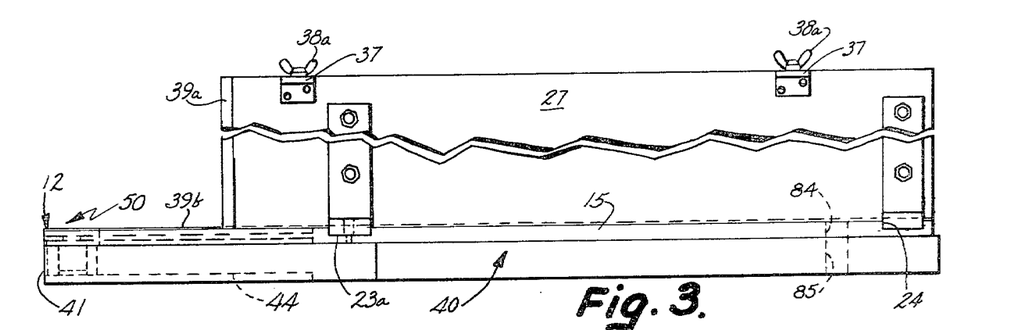
FIG. 3 is a broken, side elevation of the cutting guide shown in FIGS. 1 and 2.
Figure 4:
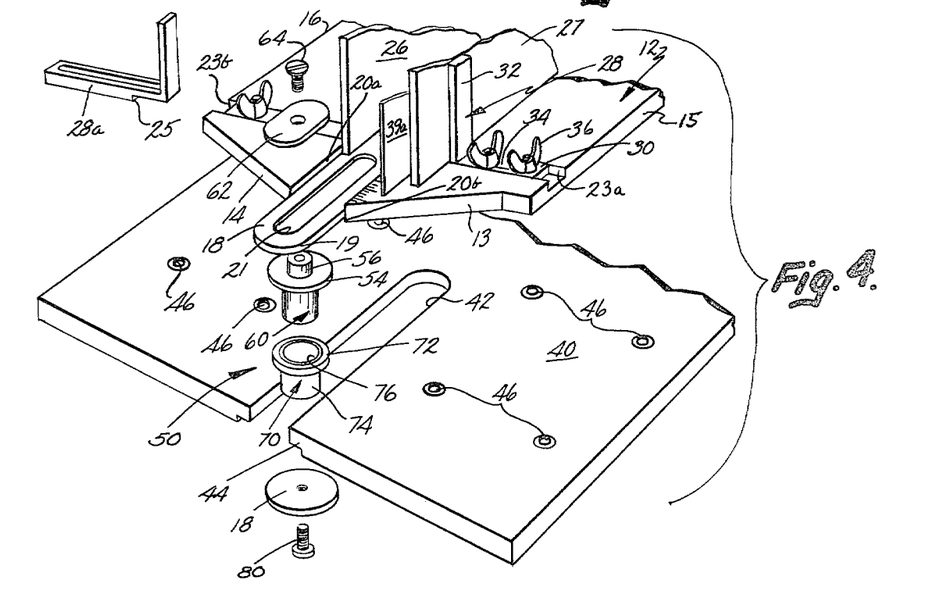
FIG. 4 is a fragmentary, exploded, perspective view of the front portion of the cutting guide of FIGS. 1-3 illustrating the pivot assembly which provides an axis of rotation.
Figure 5:
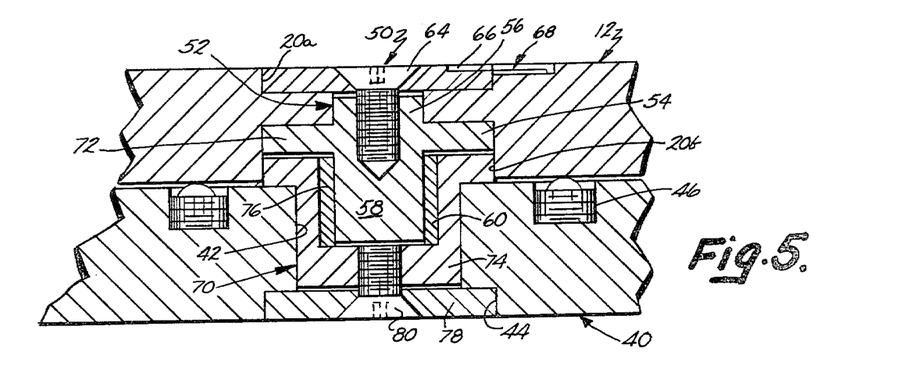
FIG. 5 is a sectional, end elevation of the pivot assembly shown in FIG. 4 when assembled.

As is best seen in FIG. 2, rotatable plate or member 12 includes a generally triangular front or forward portion having front edges 13, 14 angled at approximately 45° and leading to side edges 15, 16. The angled edges 13, 14 enable 180° cuts of various radii without cutting the material of plate 12 as is apparent from FIG. 2. Centered in the triangular forward portion is an extension 18 having a rounded end edge 19 adapted to be located immediately adjacent the cutting blade 6 as shown in FIG. 2. Extension 18 projects from the generally rectilinear recessed portion 20a, 20b in the forward part of the rotatable plate. The rectilinear portions 20a, 20b are recessed from both the top and bottom surfaces of plate 12 (FIGS. 4 and 5). Within and through the extension and rectilinear portion 18 is a closed, elongated slot or opening 21 extending parallel to the recessed edges 20a, 20 b and having closed, rounded ends. The interior ends 22 of the recess portions 20a, 20b are rounded at 22 to match the radii of the pivot assembly parts as described hereinafter. In addition, rotatable plate 12 is provided with two pair of aligned, parallel, recessed channels or slots 23a, 23b, and 24a, 24b extending transversely across the entire plate generally perpendicular to recesses 20a, 20b and extension 18 at opposite ends of the plate. Channels 23, 24 receive the slidable, L-shaped securing brackets for the upstanding support walls as described hereinafter.

As shown in FIGS. 1-4, a pair of vertically upstanding, parallel, generally planar support walls 26, 27 are secured on the top surface of rotatable plate 12. Walls 26, 27 are typically formed from fiberboard, wood or other relatively lightweight materials while rotatable plate 12 is preferably formed from aluminum plate or the like. Each support wall 26, 27 is secured to the plate 12 by means of a pair of L-shaped securing brackets 28 including generally horizontally-extending legs 30 and generally vertically-extending legs 32. Walls 26, 27 are secured to the vertical legs 32 with appropriate threaded fasteners such as flatheaded screws and nuts such that they extend generally perpendicular to the planar top surface of plate 12. The horizontal legs of brackets 28 include rectilinear slots 34 which receive therethrough a pair of spaced, threaded studs having wingnuts thereover for releasably securing the horizontal legs 30 in the channels 23, 24. As will be understood, legs 30 are slidable within channels 23, 24 while wingnuts 36 may be loosened or tightened to adjust the lateral position of walls 26, 27. Because the channel 23 is interrupted by recess 20a, a slightly different bracket 28a is used in channel portion 23b. Bracket 28a includes a notch 25 in its undersurface (FIG. 4) enabling the bracket to be slid over washer 62 in recess 20a when wall 26 is moved to the center of plate 17 as shown in FIG. 2. Channels 23, 24 extend substantially entirely across the entire transverse width of the plate to allow abutment of plates 26, 27 against one another or spacing of the walls at substantially the full width of plate 12. In addition, the studs and wingnuts 36 may be removed and relocated in different holes 36a in the channels 23, 24 to allow appropriate sliding movement of the brackets 28. Walls 26, 27 also extend from the rear edge 17 of plate 12 to the pivot assembly area of the forward portion of that plate. As such, walls 26, 27 fully and adequately support the full extent of the work piece material as is best seen in FIG. 1.

In order to provide additional support for the work piece material, a pair of adjustable, retaining clamp brackets 37 are mounted across the top edges of walls 26, 27 to prevent the top edges of the walls from moving outwardly away from one another when supporting a work piece. Brackets 37 include elongated, rectilinear slots 38 enabling a stud and wingnut 38a secured on wall 27 to slide therealong as wall 27 is moved after which the wingnuts can be tightened. Each of the brackets 37 is pivotable at 37a on wall 26 to enable swinging of the brackets 37 out of the way. However, the work pieces are normally loaded between walls 26, 27 by sliding them in between the walls from the end opening away from blade 6.

Secondary support for the portions of the work pieces which extend beyond the front edges of walls 26, 27 is provided by a generally planar, relatively thin, vertically-extending plate 39a and a generally horizontally-extending, relatively thin, generally planar plate 39b as best seen in FIG. 2. Each of the plates 39a, 39b is received between the walls 26, 27 with plate 39a resting against the inside surface of wall 27, the wall toward which the cut by blade 6 is made, and slidably movable for extension beyond the front edge of that wall. Similary, plate 39b is slidably extendable, generally horizontally to plate 12, beyond the front edges of walls 26, 27. Plate 39a provides additional lateral support for the extending portion of the work piece, while plate 39b supports the work piece therebeneath. Preferably, these plates are formed from fiberboard or the like which can be easily cut by the saw blade 6 and thus, are adapted for replacement from time to time. The typical arcs cut by the saw blade when the present apparatus is in use are shown in FIG. 2 and extend through the position of plate 39b, and possibly 39a, at times. Thus, walls 26, 27 are properly braced and supported on rotatable plate 12 and include extendable members for supplemental support of the work piece portions immediately adjacent the cutting apparatus.

As is best seen in FIGS. 4 and 5, rotatable plate 12 is mounted atop a generally planar base plate 40, also preferably formed from aluminum plate. Base 40 includes a rectilinear slot therethrough having one open end and one closed end extending perpendicularly inwardly from the front edge 41 of the base plate. Slot 42 is undercut to provide a wider, adjacent recess 44. Together, slot 42 and recess 44 receive portions of the pivot assembly 50 for securing rotatable plate 12 in various positions as described hereinafter.

The base plate also includes on its top surface a plurality of ball bearing supports at spaced locations. Bearings 46 may be units threaded into appropriate sockets in the base plate or may be assembled in the base plate in the manner described at 64 in my previous U.S. Pat. No. 3,995,521, the disclosure of which is hereby incorporated by reference. Bearings 46 provide full and adequate support for rotatable plate 12 at virtually all locations over base 40 and significantly reduce the effort needed to rotate plate 12 around pivot assembly 50 during use. It will be understood that bearings 46 could also be mounted on the underside of plate 12 for equal effect.

As is best seen in FIGS. 2, 4 and 5, pivot assembly 50 includes a series of interconnected elements forming a shaft extending between plates 12 and 40 which may be tightened and loosened to adjust the position of the axis or center of rotation of plate 12 with respect to base 40. Assembly 50 includes a first, generally cylindrical fixture 52 having an integral, annular flange 54 formed in one piece therewith near the top end of the fixture. Flange 54 has a diameter slightly smaller than the width of recess 20b such that it is slidably received within that recess. The diameter of the upper portion 56 of fixture 52 is matched to be received within slot 21 while the diameter of the lower portion 58 is matched to the inner diameter of a bronze or other journal bearing unit 60. Fixture 52 is secured to the rotatable plate 12 by means of a top washer 62 which is received flush with the top surface of plate 12, and has a width equivalent to the width of recess 20a and rounded ends matching the contour 22. A flathead, Allen bolt 64 is passed through a countersunk aperture in the center of washer 62 and threaded into the threaded hole provided in the upper end 56 of fixture 52. Portions of the extension and rectilinear portion 18 are gripped between washer 62 and flange 54. Accordingly, by tightening or loosening Allen bolt 64 with an Allen wrench, fixture 52 and washer 62 may be simultaneously moved or slid along recessed slots 20a, 20b in unison and tightened to remain in a desired position. Washer 62, which is elongated and does not rotate in recess 20a, also includes an indicating mark 66 which may be aligned with an appropriate scale 68 adjacent one side of recess 20a for accurately determining the radius from the pivot axis or the center of the aperture in which Allen bolt 64 is received to the end of extension 18 where the cutting tool or apparatus is located.

Pivot assembly 50 is secured to base 40 by means of a second, generally cylindrical fixture 70 also including an integral, annular flange 72 having a diameter matched to that of flange 54 and received in recess 20b. The lower portion 74 of fixture 70 has a diameter matched to the width of slot 42 of base 40 for sliding movement therealong. A cylindrical recess 76 in the top of fixture 70 receives journal bearing 60 which, in turn, receives fixture 52 as shown in FIG. 5. A circular washer 78 is received in recess 44 such that it is flush with the bottom surface of plate 40. A second Allen bolt 80 is received through a countersunk aperture in the center of washer 78 and secured in a threaded aperture in the bottom of fixture 70 to clamp portions of the base between flange 72 and washer 78. Accordingly, as will now be understood, loosening of Allen bolts 64 and 80 allows sliding movement of the pivot assembly along slots 21 and 42 to reposition the axis or center of rotation of plate 12 with respect to both the base 40 and the cutting blade or cutting apparatus adjacent thereto. In such case, it is preferable to utilize a retaining pin 82 (FIG. 1) inserted in aligned holes 84, 85 in plates 12, 40, respectively (FIG. 3), to maintain the position of plates 12 and 40 while the pivot assembly is being moved.

Figure 6:
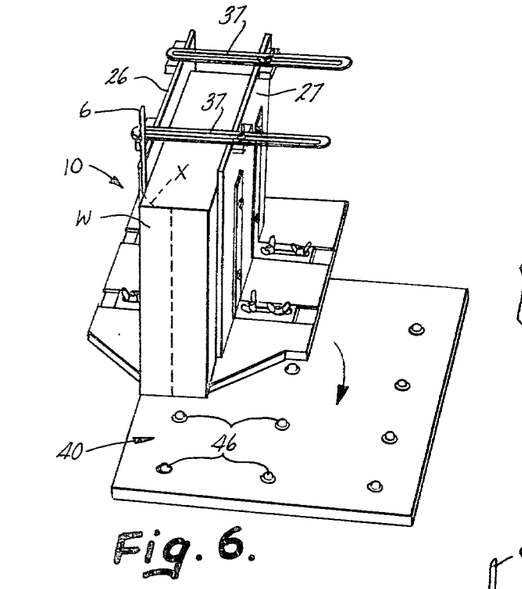
FIG. 6 is a perspective view of the cutting guide of FIGS. 1-5 at the beginning of a cutting operation.
Figure 7:
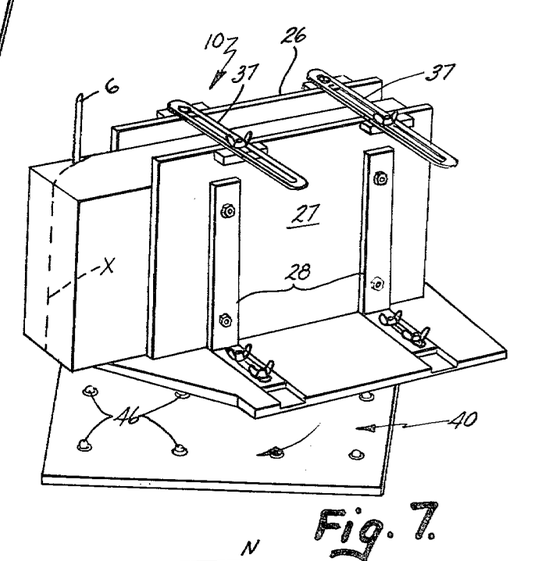
FIG. 7 is a perspective view of the cutting guide of FIGS. 1-5 after rotation and partial completion of the cutting operation initiated in FIG. 6.

As shown in FIGS. 6-9, the cutting guide 10 is easily operable to precisely and accurately cut numerous and/or varied circular arcs and paths in work pieces. In a typical operation, a block or relatively thick piece of foam rubber material such as foam rubber W is inserted on edge between support walls 26, 27 with the walls thereafter clamped in place with brackets 37. In this position, the supplemental, secondary supports 39a, 39b may or may not be used as desired. With plate 12 rotated completely to one side such that the side surface of work piece W is parallel to the side surface of blade 6, the rotatable plate 12 is then rotated clockwise as shown at FIGS. 6 and 7 such that the blade cuts into the side edge and begins to follow the curved, circular path X as shown in the figures. FIG. 7 illustrates the operation at its approximate half way point when the plate 12 has been rotated through approximately 45°. The shape of the path X is similar to that shown as path C—C in FIG. 8. Bearings 46 enable easy rotational movement of the plate 12 enabling a smooth, even, accurate arc to be cut in the foam or other work piece material.

Should a different radius cut be desired in a different work piece W, the pivot assembly 50 may be initially adjusted for the desired radius and the support walls 26, 27 positioned to begin the cutting of the arc or path at the appropriate spot on the work piece before the work piece is actually inserted in apparatus 10. In order to adjust the radius, Allen bolt 64, 80 are loosened after pin 82 is inserted in aligned apertures 84, 85. The entire shaft assembly including washer 62, bolt 64, fixture 52, bearing 60, fixture 70, washer 78 and bolt 80 is then slid to the appropriate position along slots 21, 42 to a position determined on scale 68. Allen Bolts 64, 80 are then retightened to secure the pivot assembly in the position for the desired radius as shown in FIG. 5. With such procedure, the position of plates 12, 40 with respect to the position of the blade 6 need not be changed, nor is the position of plate 12 changed with respect to plate 40.

Figure 8:
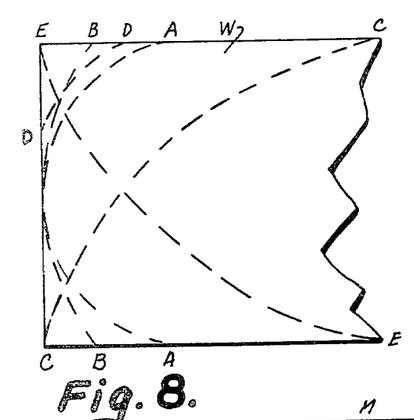
FIG. 8 is a fragmentary, schematic view of one portion of a work piece to be cut with the cutting guide of the present invention illustrating various curved arcs and paths which can be cut with the invention.
Figure 9:
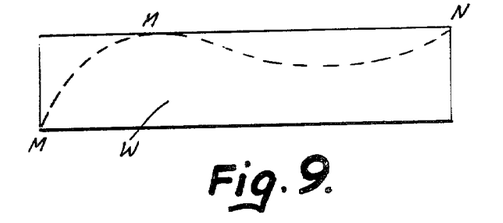
FIG. 9 is a schematic view of another work piece illustrating a compound curve in a work piece which curve can at least be partially cut with the present invention.

As illustrated in FIGS. 8 and 9, various arcs may be cut in a typical work piece W. For instance, shallow or deep, 180°, and/or semi-circular cuts such as paths A—A and B—B may be cut in the end of a work piece. A large, shallow arc such as C—C may be cut using the method of operation shown in FIGS. 6 and 7 and described above. A smaller arc D—D on one corner of the work piece may also be made. Finally, cuts in the opposite direction such as E—E may be made by starting the rotatable plate 12 in the position shown in FIGS. 1 and 2 and rotating that plate clockwise through 90°. For E—E support walls 26, 27 would be initially placed in the positions shown in FIG. 2. As indicated, these walls are initially positioned before a cut depending on what type of cut will be made.

In addition, compound curves may be at least partially cut with the present apparatus. As shown in FIG. 9, an arc or curved path such as that cut with the operation shown in FIGS. 6 and 7 producing a path M—M may be first cut in a work piece W. Secondly, a large, shallow arc in the side surface of the work piece, namely, path M-N in FIG. 9, may be cut using a work holding bracket and center point determining means such as that of my prior invention which is described and claimed in U.S. Pat. No. 3,995,521 mentioned and incorporated herein. Accordingly, the present invention enables the production of compound curvatures in a much more efficient and accurate manner.

Referring now to FIGS. 10-13, a second embodiment 90 of the cutting guide of the present invention including a remote pivot assembly adjustment apparatus 110 and utilizing the existing saw table 92 of a conventional band saw with blade 6' or the like as a base is illustrated. This form of the invention enables cutting of precise radii in the work pieces as well as long straight cuts when apparatus 110 and swinging plate 12' are removed. Embodiment 90 includes a rotatable member or plate 12' which is exactly the same as plate 12. The extension 18' is formed by recesses 20a' and 20b' and includes a slot 21' and curved ends 22' as in embodiment 10. In addition, upstanding support walls 26' 27' are supported by L-shaped securing brackets 28', and 28a' mounted in channels 23', 24' in the same manner as in embodiment 10.

A principle difference between embodiments 10 and 90 is the mounting of rotatable plate 12' on an existing work support saw table 92 which serves as the base for the rotatable plate. Table 92 includes a main, rectangular, generally planar portion 93 and two smaller rectangular, generally planar portions 94, 95 spaced slightly from main portion 93 by a laterally-extending, transverse slot 96 and from one another by slot 97. Slot 97 allows removal and remounting of new saw blades. Saw blade 6' extends through slot 96 which allows the table to be moved laterally with the blade remaining in the slot as described hereinafter. In addition, the plate 12' may include bearings such as those described above at 46 in its bottom surface for rotatably supporting it atop saw table portion 93 in the manner described above.

Table portions 93, 94, 95 are laterally movable on a series of support rollers 98 rotatably secured to downwardly-extending support members or flanges 100 (FIGS. 10 and 11) secured by appropriate fasteners to the undersides of the table portions. Rollers 98 are supported by support rails 102 on top of support legs 103 (FIG. 11) which support entire table 92. Rails 102 extend parallel to one another and to support flanges 100. Stop or limiting rails 104 are secured on either lateral side of the table assembly and include springs 105 projecting therefrom to provide a cushioned limitation when the table is moved. The entire table may thus be moved laterally to position blade 6' in various portions of slot 96 by movement of rollers 98 on support rails 102.

Figures 10, 11, 12:
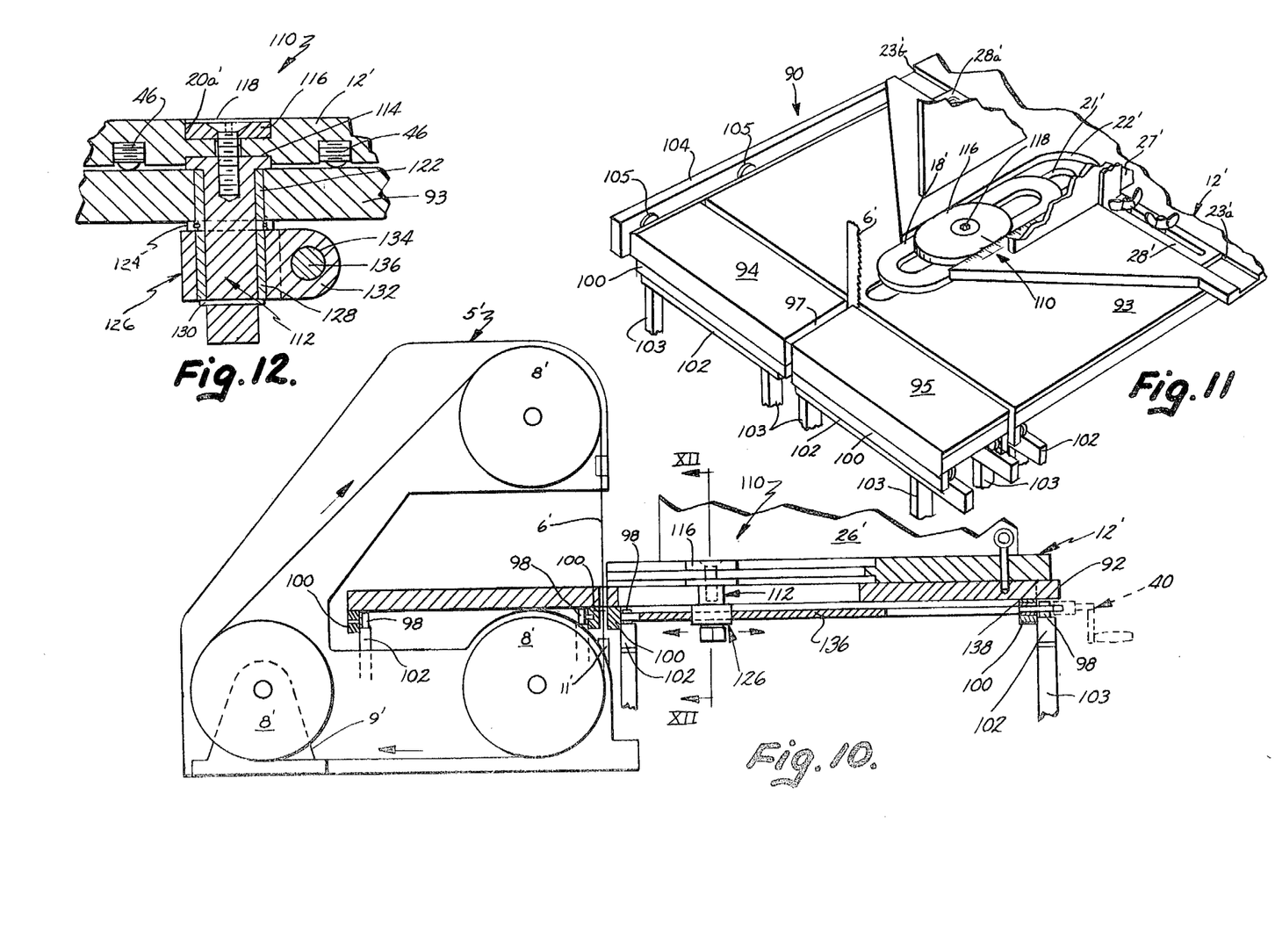
FIG. 10 is a fragmentary, sectional side elevation of a second form of the cutting guide of the present invention shown assembled with an existing, movable saw table of a band saw and including a modified pivot assembly.
FIG. 11 is a fragmentary, perspective view of the front portion of the cutting guide of FIG. 10.
FIG. 12 is a fragmentary, sectional end elevation of the pivot assembly of the cutting guide taken along plane XII—XII of FIG. 10.
Figure 13:
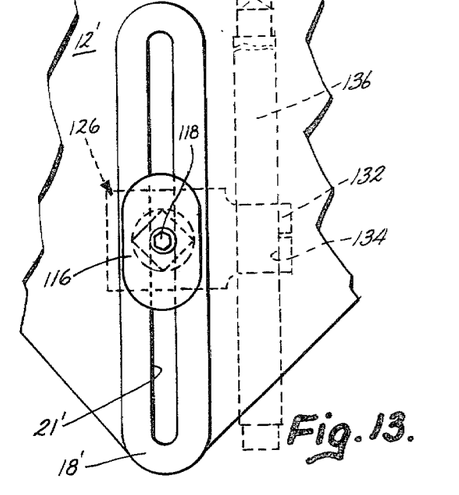
FIG. 13 is a fragmentary, top plan view of the pivot assembly area of the cutting guide shown in FIGS. 10-12.

Table 92 is provided in conjunction with a conventional band-type saw 5' shown schematically in FIG. 10. Saw 5' includes a plurality of blade support wheels 8', and electric or other operating motor 9', and a pair of roller-type blade guides 11' positioned above and below the cutting portion of blade 6'.

Another principle difference of embodiment 90 from embodiment 10 is the inclusion of a modified pivot assembly 110 also including an adjustment mechanism controllable from a position remote from the pivot assembly. As shown in FIGS. 10-13, assembly 110 includes a generally cylindrical shaft or fixture 112 having an annular, integral flange 114 formed in one piece therewith at its upper end. Flange 114 has a diameter slightly smaller than the width of recessed 20b' for receipt therein. Cooperating with flange 114 is an upper, elongated washer 116 similar to washer 62 having a width sized to be received within the width of recess 20a' as shown in FIG. 12. Washer 116 is secured to the upper end of fixture 114 by means of a threaded Allen bolt 118 passed through a countersunk, central aperture in washer 116 and into a threaded aperture in the top of fixture 114. Tightening of bolt 118 thus clamps flange 114 and washer 116 together against the intermediate portion of plate 12'.

The lower portion of fixture 112 passes through a journal bearing 120 received in slot 122 formed in table portion 93 and extending perpendicularly away from the slot 96. A thrust bearing 124 is telescoped over the lower end of fixture 112 and retained against the underside of table portion 93 by means of an adjustment block 126 receiving a second journal bearing 128 in a circular aperture extending therethrough. Adjustment block is retained on fixture 112 by means of a snap ring 130 telescoped over the fixture and received under the block 126. Block 126 includes a laterally-extending flange 132 having a threaded aperture 134 therethrough extending generally transverse and perpendicular to the direction of extension of the aperature receiving bearing 128 and the lower portion of fixture 112 in the adjustment block. Threaded aperture 134 receives the threaded remote adjusting rod 136 (FIGS. 10, 12 and 13) which is rotatably supported by support flanges 100 at opposite edges of table portion 93 in suitable journal bearings shown for example at 138 in the right-hand portion of FIG. 10. The extreme outer end of threaded rod 136 is square to receive a removable crank handle 140 to enable rotation of the threaded rod for movement of adjusting block 126 and thus, pivot assembly 110, when Allen bolt 118 is released or loosened. The lower end of fixture 112 is also square for wrench retention purposes when Allen bolt 118 must be tightened or loosened.

In order to adjust the radius from the center of the aperture in washer 116 to the position of blade 6', and thus the position of the axis or center of rotation of plate 12' with respect to saw table or base 92, Allen bolt 118 is loosened with an Allen wrench while the end of fixture 112 is held with a wrench. Crank 140 is telescoped over the end of rod 136 and the rod rotated therewith in the appropriate clockwise or counterclockwise direction to move adjusting block 126 toward or away from blade 6'. Such movement simultaneously moves fixture 112 and washer 116 as well as bolt 118 and the appropriate bearings therewith slidably along slots 21' and 122 in plates 12' and table 92, respectively. A scale may also be provided along recess 20a' and a mark on washer 116 as in embodiment 10 to determine the appropriate radius. When the radius as desired is reached, fixture 112 is retained with a wrench while bolt 118 is tightened to secure the pivot assembly 110 at the desired radius position. During such procedure, retaining pin 85' is inserted through appropriate aligned apertures in plates 12' and base table 92 to prevent these plates and tables from moving with respect to one another during movement of the pivot assembly. Work pieces may then be inserted and supported between support walls 26', 27' and plate 12' rotated over table base 92 on bearings 46 to cut appropriate curved, circular arcs in the work piece or pieces in the manner described above in connection with embodiment 10 and FIGS. 6–9.

In order to remove plate 12' and assembly 110 from table 92, it is only necessary to remove snap ring 130 from fixture 112 and lift plate 12' including fixture 112 and bearing 122 off table 92. Table 92 may then be used in its standard manner. When plate 12' is removed it is preferable to cover the table with a thin piece of sheet metal to prevent foreign objects from contaminating bearing 128 or any remaining part of assembly 110 through slot 122.

As is now apparent, the present cutting guide may be used either with a separate, portable base such as base 40 or an existing saw table base such as that at 92. The guides 10 or 90 enable precise, accurate cutting of various materials including soft, pliable, flexible material such as foamed rubber in a highly efficient, reproducible manner heretofore unobtainable.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A cutting guide for supporting and guiding a work piece such as flexible foam material or the like during cutting of an arc or curved path in the work piece comprising:
   a base;
   a rotatable member rotatably mounted on said base for rotation about a center;
   rigid, upstanding, support means on said rotatable member for supporting a work piece to be cut in an arc or curved path; and
   pivot means on said base and rotatable member for providing and fixing a center of rotation of said rotatable member with respect to said base, said rotatable member being rotatable about said pivot means to guide the cutting of a precise circular arc or curve in a work piece when said cutting blade is located adjacent a cutting apparatus such as a band or other type saw and a work piece is supported by said support means;
   said upstanding support means including a pair of spaced, upright walls secured atop said rotatable member, said walls adapted to confine a work piece laterally of the direction of a radius extending from said center of rotation and defining openings parallel to said direction of said radius which allow insertion and movement of a work piece between said walls toward the cutting apparatus from a position spaced from that location, at least one support for each of said walls, said supports each including securing means for securing said supports at various positions on said rotatable member whereby the spacing between said walls is adjustable laterally of said radial direction to support different sized work pieces and to support work pieces at different positions with respect to said center of rotation.

2. The cutting guide of claim 1 wherein said rotatable member includes an opening therethrough; said pivot means including shaft means extending through said opening and secured to said base for providing an axis of rotation for said rotatable member.

3. The cutting guide of claim 1 including remote adjustment means for changing the position of said center of rotation.

4. The cutting guide of claim 2 wherein said elongated opening in said rotatable member is a slot having closed ends; said slot being located in a portion of said rotatable member which is recessed below a surface of said rotatable member; said securing means received in said recessed portion.

5. The cutting guide of claim 1 wherein said walls each include an upright panel; said supports each comprise an L-shaped bracket, one leg of each bracket secured to one of said panels, the other leg of each of said brackets secured to said rotatable member with said securing means; said securing means including an elongated recess in said rotatable member for receiving and allowing sliding movement of said other bracket leg and at least one releasable fastener for securing said other bracket leg in said recess at various positions.

6. The cutting guide of claim 1 including at least one retaining means secured between said walls for maintaining the same spacing of said walls along their entire height.

7. The cutting guide of claim 1 wherein said rotatable member includes an extension at one end; said pivot means mounted in alignment with said extension.

8. The cutting guide of claim 1 wherein said base is a portable, generally planar, rectangular plate.

9. The cutting guide of claim 1 wherein said base is the existing table of a cutting apparatus such as a band saw, said table being adjacent the cutting tool of the cutting apparatus and including receiving means for receiving and securing at least a portion of said pivot means thereto.

10. The cutting guide of claim 9 wherein said table includes a slot for receiving the cutting tool of a cutting apparatus such as a band saw blade; said table including a plurality of support rollers; said rollers mounted on a series of elongated supports parallel to said slot such that a said table is movable on said rollers parallel to said slot with said cutting tool remaining in said slot.

11. The cutting guide of claim 10 further including stops adjacent either side of said table for limiting movement of said table on said rollers.

12. A cutting guide for supporting and guiding a work piece such as flexible foam material or the like during cutting of an arc or curved path in the work piece comprising:
   a base;
   a rotatable member rotatably mounted on said base for rotation about a center;
   rigid, upstanding, support means on said rotatable member for supporting a work piece to be cut in an arc or curved path; and pivot means on said base and rotatable member for providing and fixing a center of rotation of said rotatable member with respect to said base whereby said rotatable member is rotatable about said pivot means to guide the cutting of a precise circular arc or curve in a work piece when said cutting guide is located adjacent a cutting apparatus such as a band or other type saw and a work piece is supported by said support means;
   said rotatable member including an elongated opening therethrough; said pivot means including shaft means extending through said opening and secured to said base for providing an axis of rotation for said rotatable member and securing means for fixing said shaft means at various positions within said elongated opening whereby said shaft means can be moved and relocated within said opening to provide different radii from the axis of rotation to a cutting apparatus.

13. The cutting guide of claim 12 wherein said shaft means includes a first fixture and bearing means for rotatably mounting said first fixture; said securing means including first means for releasably securing said first fixture to said rotatable member and second means for releasably securing said bearing means to said base.

14. The cutting guide of claim 13 wherein said first fixture is generally cylindrical; said first means includes a flange on said first fixture, a first washer, said first fastening means between said first fixture and first washer for securing said flange and washer to portions of said rotatable member adjacent said elongated opening; said base including an elongated opening; said second means including a second fixture received in said base opening and having a flange thereon and receiving said bearing means, a second washer, and second fastening means between said second fixture and second washer for securing said flange of said second fixture and second washer to portions of said base.

15. The cutting guide of claim 14 wherein said bearing means include a journal bearing receiving a portion of said generally cylindrical first fixture and received in a recess in said fixture; said rotatable member comprising a generally planar plate including a positioning scale alongside said opening for determining the position of said pivot means; said base including a plurality of bearings projecting above the surface of said base for supporting said rotatable plate thereon.

16. The cutting guide of claim 13 wherein said first fixture is generally cylindrical; said first means including a flange on said first fixture, a first washer, and first fastening means between said first fixture and first washer for securing said flange and washer to portions of said rotatable member adjacent said elongated opening; said base including an elongated opening; said second means including remote adjustment means for moving said shaft means and said securing means along said elongated openings to various positions when said securing means are released.

17. The cutting guide of claim 16 wherein said remote adjustment means include an adjustment block secured to the lower end of said cylindrical first fixture and a rotatable, threaded shaft engaging said adjustment block for moving said adjustment block from a remote position; a pin; and said rotatable member and base including aligned pin-receiving holes for receiving said pin during use of said remote adjustment means to prevent movement of said rotatable member and base.

18. A cutting guide for supporting and guiding a work piece such as flexible foam material or the like during cutting of an arc or curved path in the work piece comprising:
   a base;
   a rotatable member rotatably mounted on said base for rotation about a center;
   rigid, upstanding, support means on said rotatable member for supporting a work piece to be cut in an arc or curved path; and
   pivot means on said base and rotatable member for providing and fixing a center of rotation of said rotatable member with respect to said base whereby said rotatable member is rotatable about said pivot means to guide the cutting of a precise circular arc or curve in a work piece when said cutting guide is located adjacent a cutting apparatus such as a band or other type saw and a work piece is supported by said support means;
   said upstanding support means including a pair of spaced, upright walls secured atop said rotatable member; at least one retaining means secured between said walls for maintaining the same spacing of said walls along their entire height; said retaining means including a slotted, adjustable length bracket secured across the tops of said walls, said bracket being adjustable to match the spacing of said walls.

19. A cutting guide for supporting and guiding a work piece such as flexible foam material or the like during cutting of an arc or curved path in the work piece comprising:
   a base;
   a rotatable member rotatably mounted on said base for rotation about a center;
   rigid, upstanding, support means on said rotatable member for supporting a work piece to be cut in an arc or curved path; and
   pivot means on said base and rotatable member for providing and fixing a center of rotation of said rotatable member with respect to said base whereby said rotatable member is rotatable about said pivot means to guide the cutting of a precise circular arc or curve in a work piece when said cutting guide is located adjacent a cutting apparatus such as a band or other type saw and a work piece is supported by said support means;
   said upstanding support means including a pair of spaced, upright walls secured atop said rotatable member;
   a secondary wall plate slidably received between and parallel to said walls and adapted to be slidably extended beyond at least one end edge of at least one of said walls for extended lateral support of a work piece when a work piece is received between said walls.

20. A cutting guide for supporting and guiding a work piece such as flexible foam material or the like during cutting of an arc or curved path in the work piece comprising:

a base;

a rotatable member rotatably mounted on said base for rotation about a center;

rigid, upstanding, support means on said rotatable member for supporting a work piece to be cut in an arc or curved path; and pivot means on said base and rotatable member for providing and fixing a center of rotation of said rotatable member with respect to said base whereby said rotatable member is rotatable about said pivot means to guide the cutting of a precise circular arc or curve in a work piece when said cutting guide is located adjacent a cutting apparatus such as a band or other type saw and a work piece is supported by said support means;

said upstanding support means including a pair of spaced, upright walls secured atop said rotatable member;

a secondary base plate slidably received between and perpendicular to said walls atop and parallel to said rotatable member and adapted to be slidably extended beneath a work piece beyond at least one end edge of at least one of said walls for extended support beneath a work piece when a work piece is received between said walls.

21. A cutting guide for supporting and guiding a work piece such as flexible foam material or the like during cutting of an arc or curved path in the work piece comprising:

a base;

a rotatable member rotatably mounted on said base for rotation about a center;

rigid, upstanding, support means on said rotatable member for supporting a work piece to be cut in an arc or curved path; and pivot means on said base and rotatable member for providing and fixing a center of rotation of said rotatable member with respect to said base whereby said rotatable member is rotatable about said pivot means to guide the cutting of a precise circular arc or curve in a work piece when said cutting guide is located adjacent a cutting apparatus such as a band or other type saw and a work piece is supported by said support means;

said rotatable member including an extension at one end; said pivot means mounted in alignment with said extension; said rotatable member including a generally planar plate having two planar surfaces; said extension having a rounded end adapted for location immediately adjacent a cutting apparatus; said extension extending outwardly from an elongated recessed portion of said rotatable plate which is recessed below both surfaces of said rotatable plate for receiving said pivot means; said rotatable plate also including at least one recessed slot in the uppermost of said plate surfaces for receiving securing means for said upstanding support means, said recessed slot extending perpendicularly to said elongated, recessed portion of said rotatable plate.

22. A cutting guide for supporting and guiding a work piece such as flexible foam material or the like during cutting of an arc or curved path in the work piece comprising:

rotatable means for rotation about a center;

a rigid, upstanding, support means on said rotatable means for supporting a work piece to be cut in an arc or curved path; and pivot means on said rotatable means for providing a center of rotation for said rotatable means when said rotatable means is mounted on a support, said rotatable means being rotatable about said pivot means to guide the cutting of a precise circular arc or curve in a work piece;

said upstanding support means including a pair of spaced, upright walls secured atop said rotatable member, said walls adapted to confine a work piece laterally to the direction of a radius extending from said center of rotation and defining openings parallel to said direction of said radius which allow insertion and movement of a work piece between said walls toward the cutting apparatus from a position spaced from that location, at least one support for each of said walls, said supports each including securing means for securing said supports at various positions on said rotatable member whereby the spacing between said walls is adjustable laterally of said radial direction to support different sized work piece and to support work pieces at different positions with respect to said center of rotation.

23. The cutting guide of claim 22 including at least one retaining means secured between said walls for maintaining the same spacing of said walls along their entire height.

24. A cutting guide for supporting and guiding a work piece such as flexible foam material or the like during cutting of an arc or curved path in the work piece comprising:

rotatable means for rotation about a center;

a rigid, upstanding, support means on said rotatable means for supporting a work piece to be cut in an arc or curved path; and pivot means on said rotatable means for providing a center of rotation for said rotatable means when said rotatable means is mounted on a support whereby said rotatable means is rotatable about said pivot means to guide the cutting of a precise circular arc or curve in a work piece;

said rotatable means including a plate having an elongated opening therethrough; said pivot means including shaft means extending through said plate opening to provide an axis of rotation for said plate and securing means for fixing said shaft means at various positions within said opening whereby said shaft means can be moved and relocated within said opening to provide different radii from the axis of rotation to a cutting apparatus.

25. The cutting guide of claim 24 including remote adjustment means for changing the position of said shaft means in said plate opening.

* * * * *

UNITED STATES PATENT AND TRADEMARK OFFICE
CERTIFICATE OF CORRECTION

PATENT NO. : 4,270,426

DATED : June 2, 1981

INVENTOR(S) : Rouchdy B. Raphael

It is certified that error appears in the above-identified patent and that said Letters Patent are hereby corrected as shown below:

Column 5, lines 13 and 14:
"Similary" should be --Similarly--

Column 10, line 6:
"blade" should be --guide--

Column 11, line 3:
delete "a"

Signed and Sealed this

Eighteenth Day of August 1981

[SEAL]

Attest:

Attesting Officer

GERALD J. MOSSINGHOFF

Commissioner of Patents and Trademarks